Oct. 10, 1939.　　　K. A. BRAUNING　　　2,175,791
TUBULAR LOCK
Filed Feb. 20, 1935　　　7 Sheets-Sheet 1
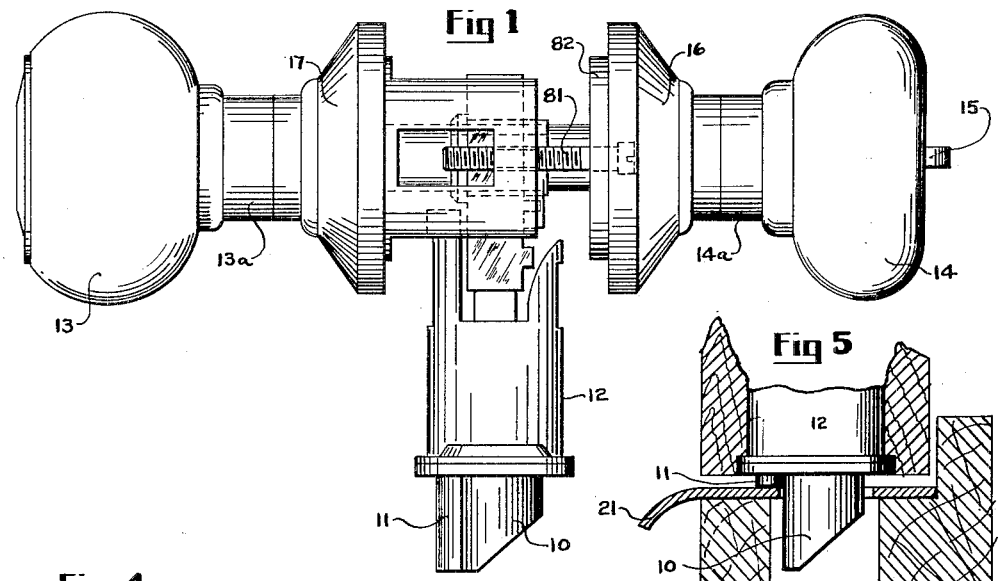
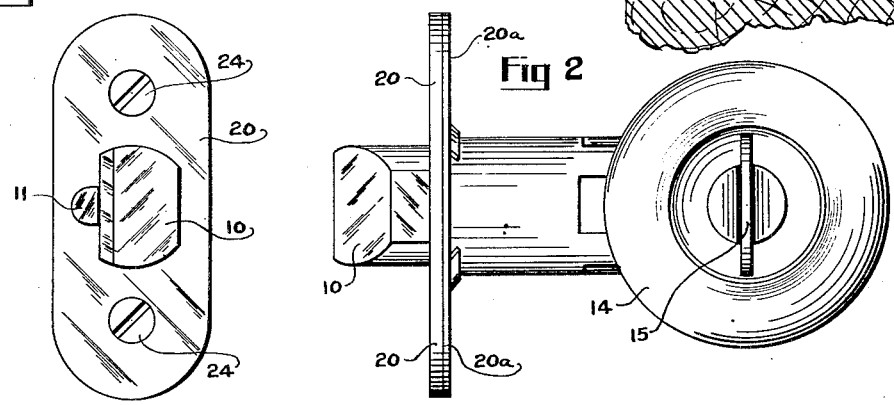
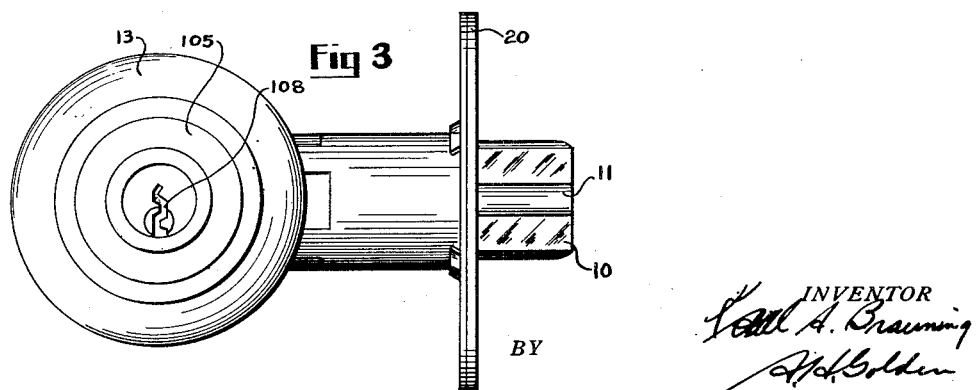
INVENTOR
Karl A. Brauning
BY
ATTORNEY Oct. 10, 1939.   K. A. BRAUNING   2,175,791
TUBULAR LOCK
Filed Feb. 20, 1935   7 Sheets-Sheet 2
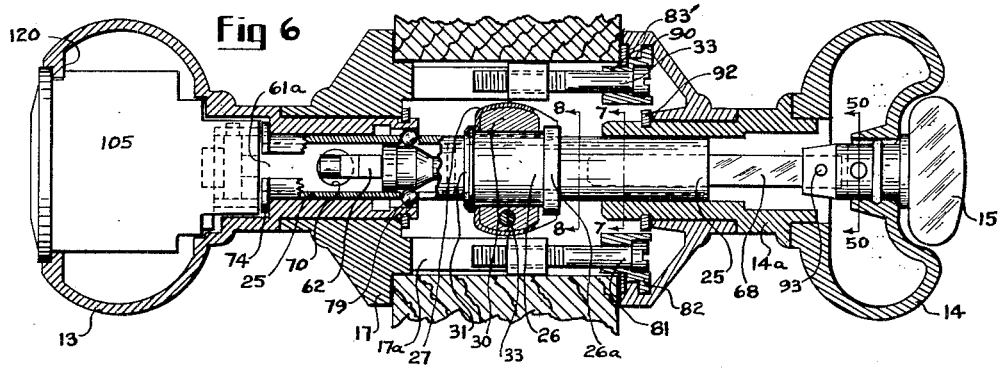
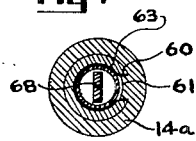
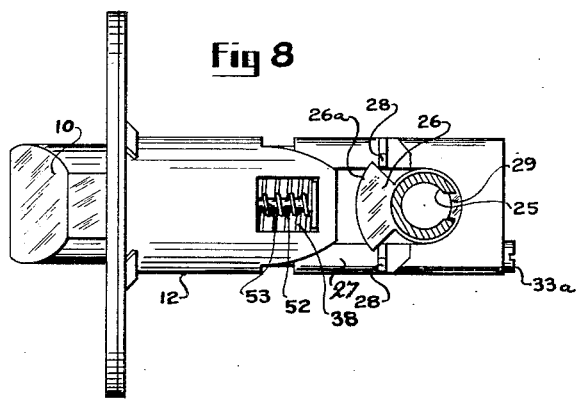
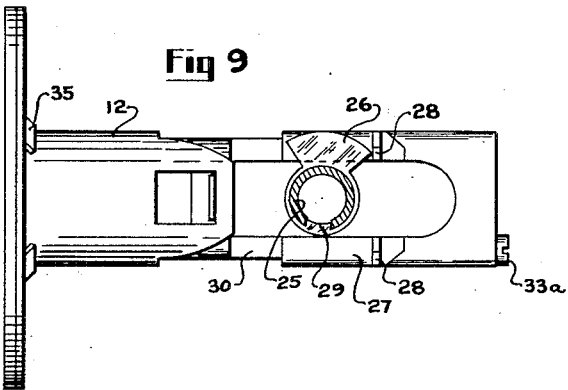
INVENTOR
Karl A. Brauning
BY
ATTORNEY Oct. 10, 1939.   K. A. BRAUNING   2,175,791
TUBULAR LOCK
Filed Feb. 20, 1935   7 Sheets-Sheet 3
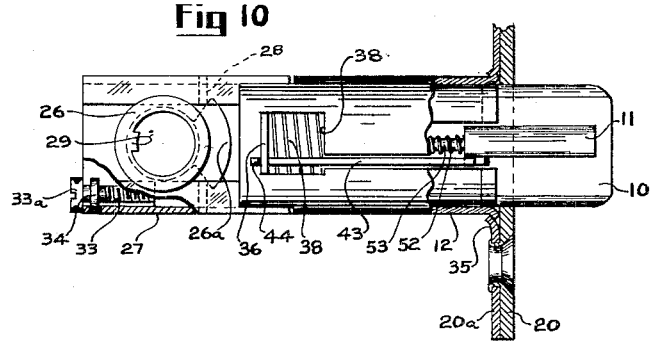
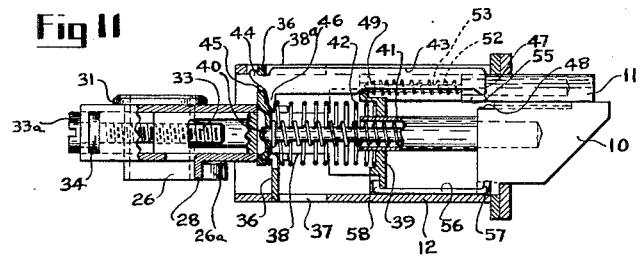
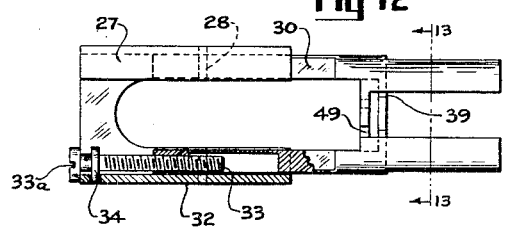
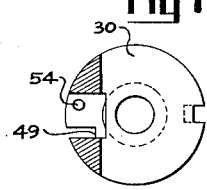
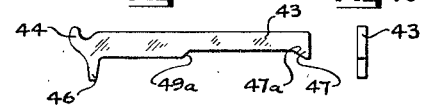
INVENTOR
Karl A. Brauning
BY
A H Golden
ATTORNEY

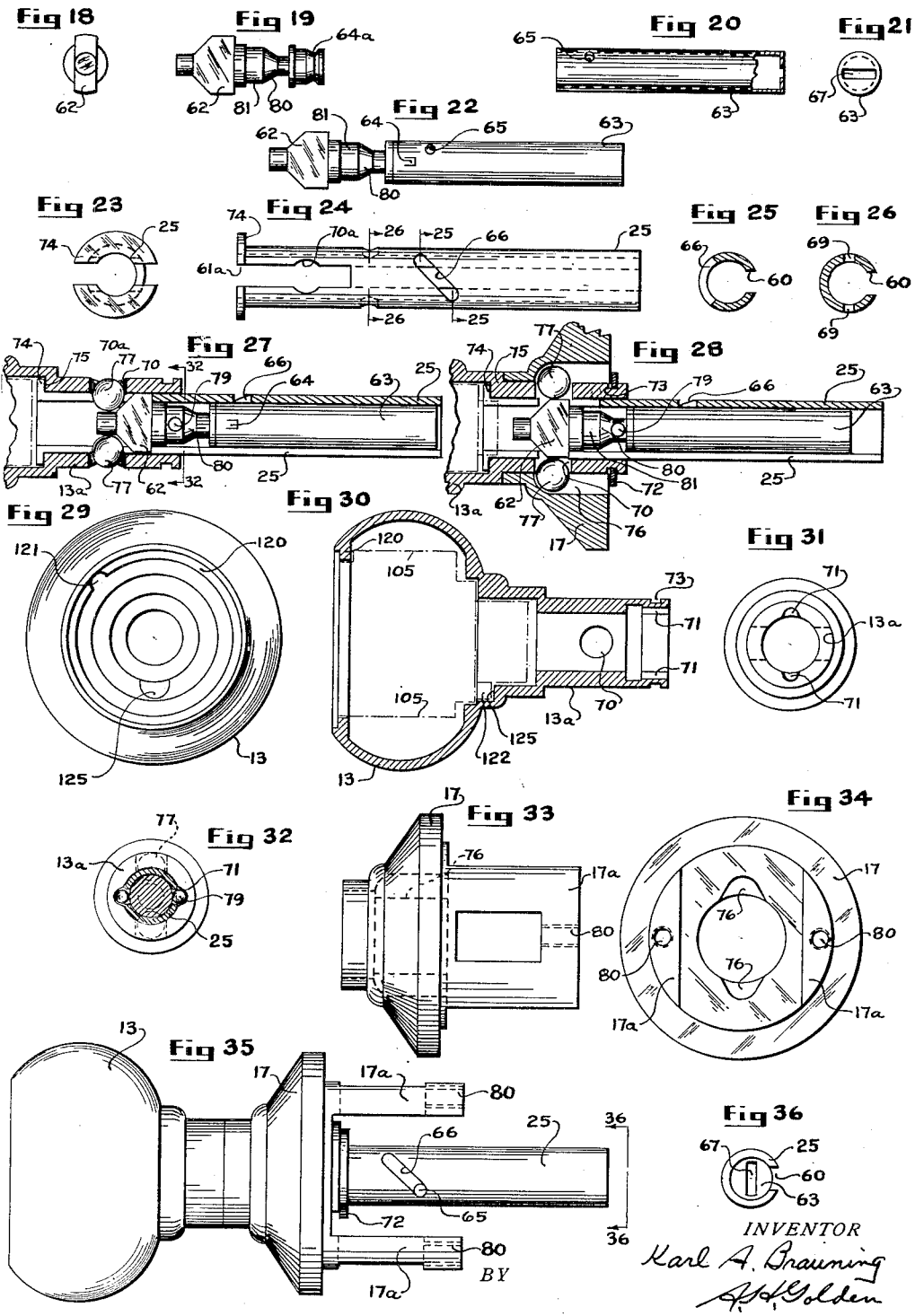

Oct. 10, 1939.   K. A. BRAUNING   2,175,791
TUBULAR LOCK
Filed Feb. 20, 1935   7 Sheets-Sheet 5
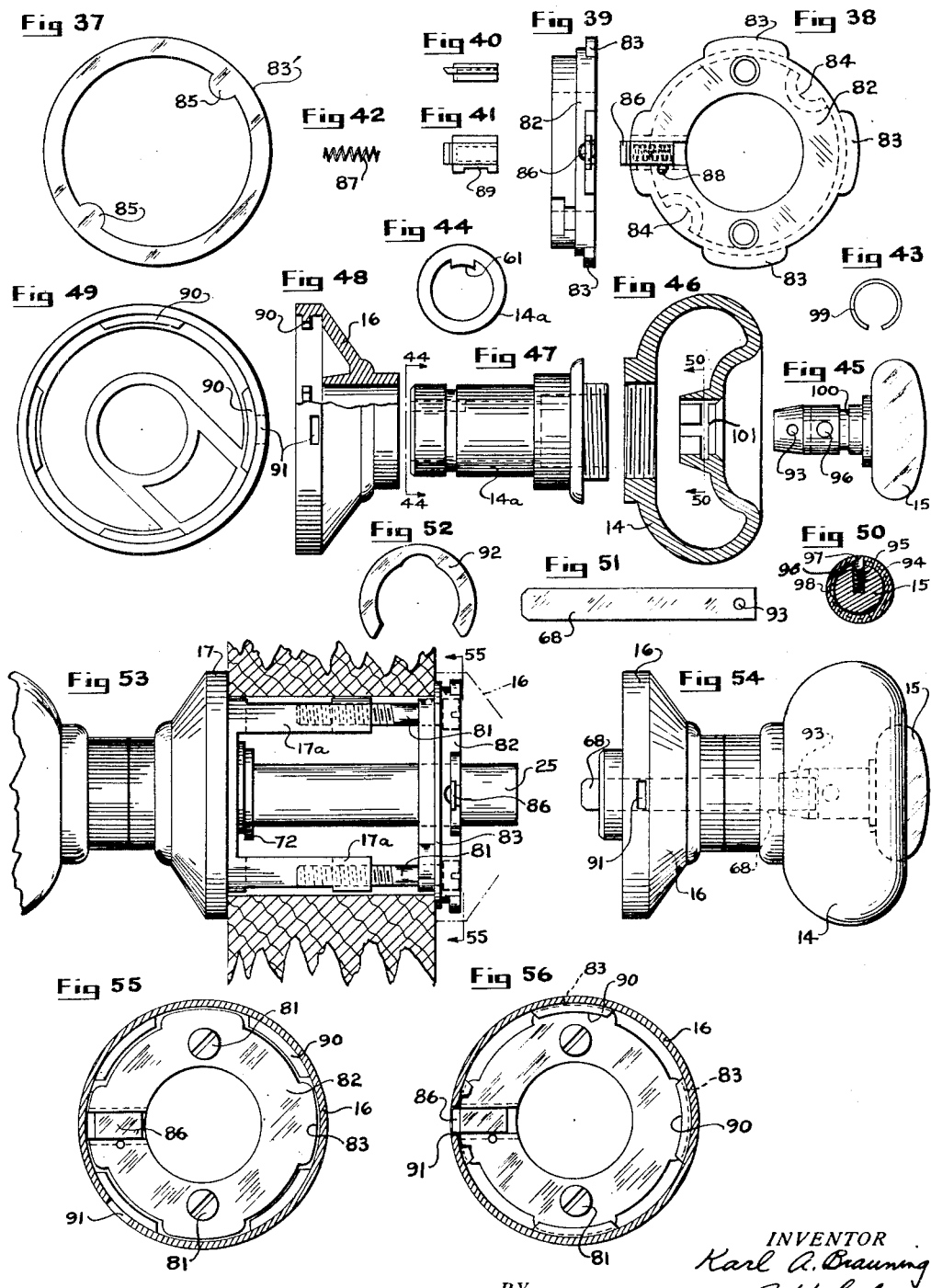
INVENTOR
Karl A. Brauning
BY A. H. Golden
ATTORNEY

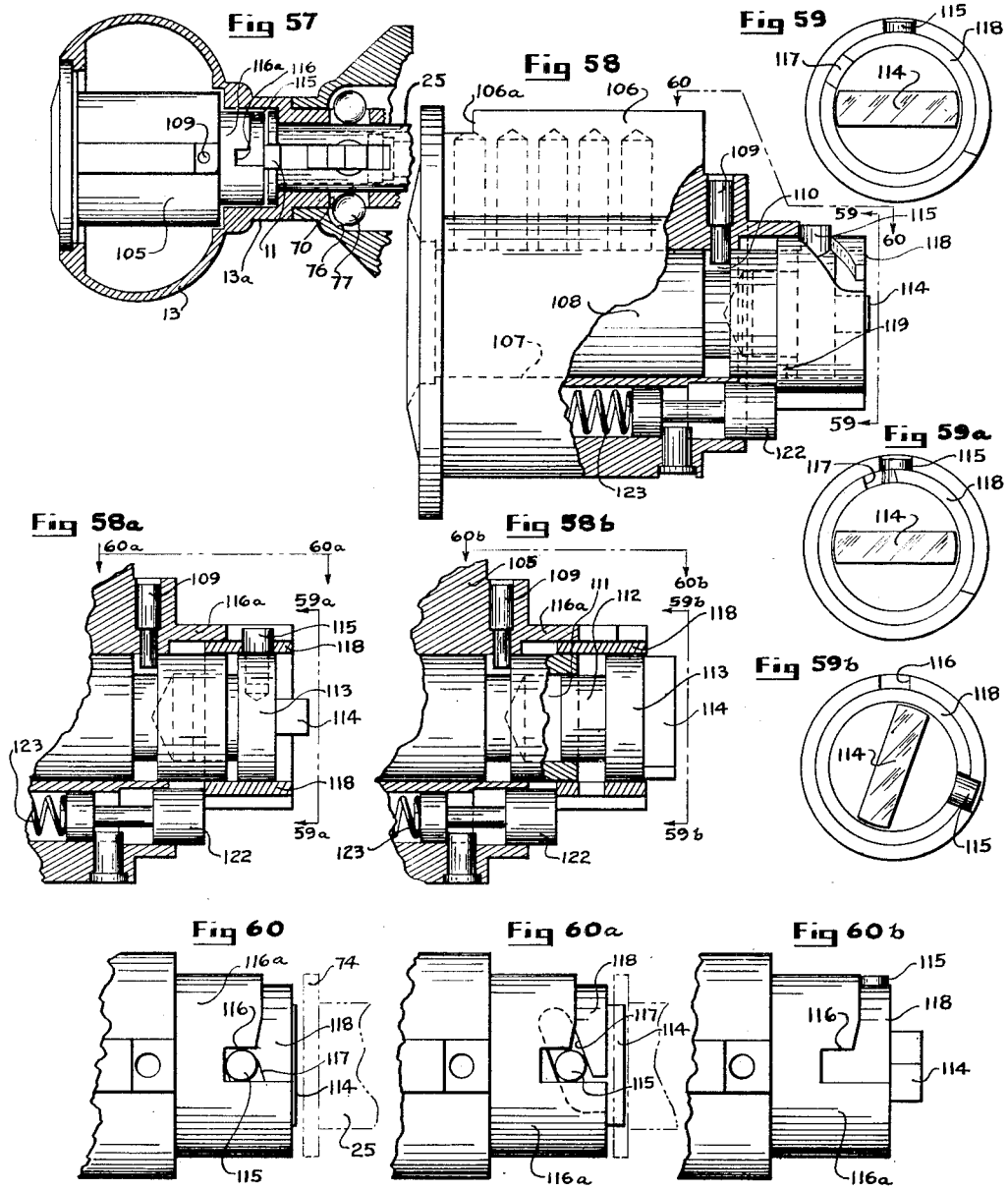

Oct. 10, 1939.  K. A. BRAUNING  2,175,791
TUBULAR LOCK
Filed Feb. 20, 1935  7 Sheets-Sheet 7
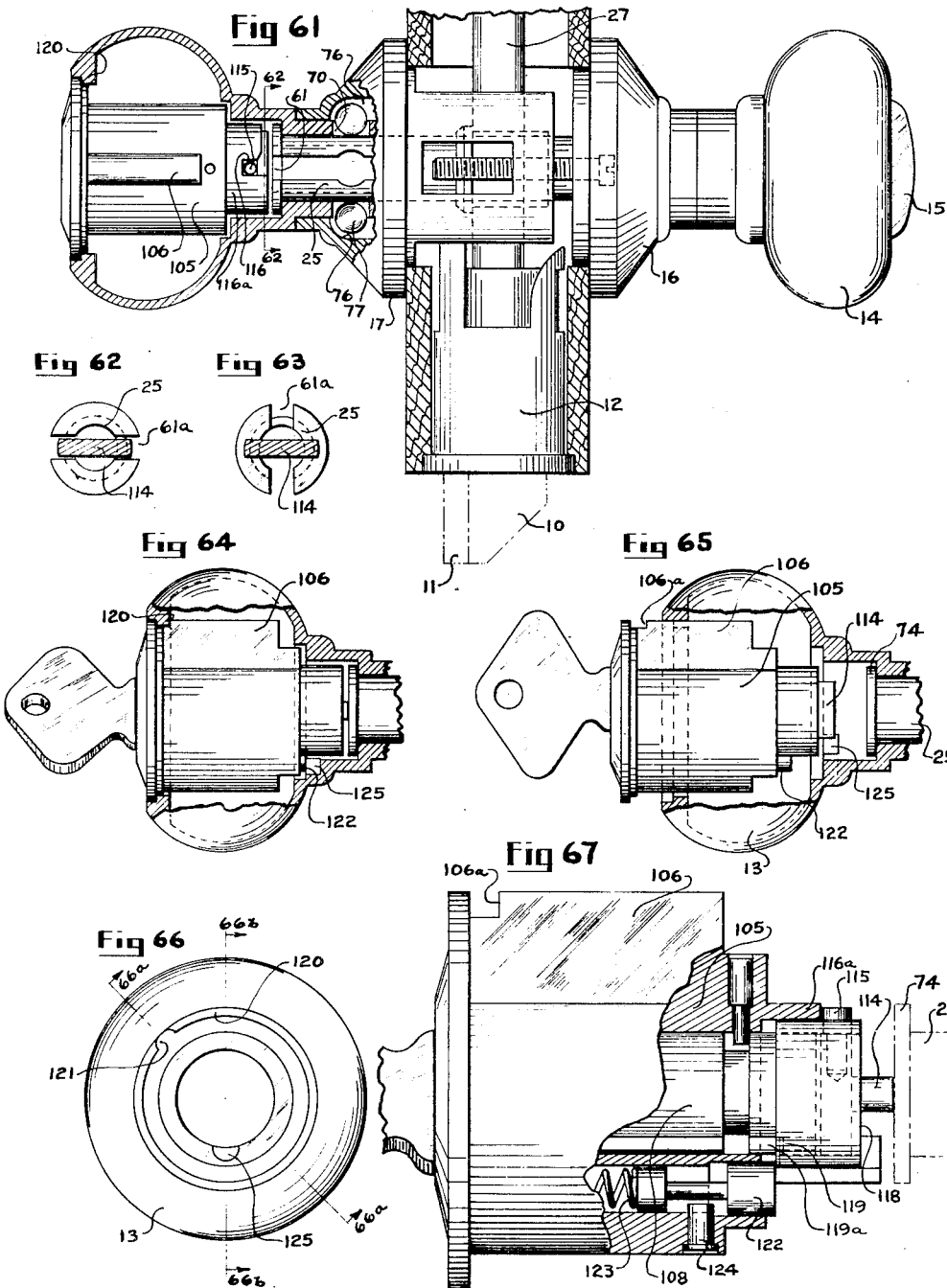
INVENTOR
Karl A. Brauning
BY
J. H. Golden
ATTORNEY Patented Oct. 10, 1939

2,175,791

UNITED STATES PATENT OFFICE 2,175,791

TUBULAR LOCK

Karl A. Brauning, Stamford, Conn., assignor to The Yale & Towne Manufacturing Co., Stamford, Conn., a corporation of Connecticut Application February 20, 1935, Serial No. 7,403

14 Claims. (Cl. 70—146)

This invention relates to locks of the tubular type. More especially, this invention relates to a lock having a mechanical construction especially adapted for use in a tubular lock of the type inserted in a door by the joining of a spindle portion with a latch operating portion, the spindle portion being inserted through a transverse hole in the door, while the latch portion is inserted in a hole running inwardly from the edge of the door. While I shall describe the invention with relation to a tubular lock, it will of course be readily appreciated that many of its features may be utilized in locks other than those of the tubular type.

One of the important features in a lock of the type to be described is that of an adjustable backset. My invention provides a readily adjustable backset which may be obtained by very simple means. More particularly, the backset arrangement I have devised utilizes a bolt having a rollback operated portion which is adjustable relatively to the main bolt body. Even more particularly, I utilize a rollback portion which is slidable relatively to the main bolt body and is adjustable by means of a screw joining the two parts.

My invention also provides a very novel latch bolt assembly and a latch deadlocking means. More particularly, I provide a tubular latch bolt housing having an end plate which is held in position by a spring tending to project the bolt mounted in the housing. This same end plate supports a deadlocking lever which is preferably actuated by the bolt projecting spring. The latch bolt retracting means is adapted to retract the latch bolt against its spring and while doing so, moves the deadlocking lever against the pressure of the same spring and out of deadlocking relation to the latch bolt nose.

A further feature of my invention resides in the rather unique method I employ for joining the outside and inside knobs and roses and for maintaining the knobs and spindle in assembled relation to the door, and for providing easy and fast assembly. More particularly, I utilize an inner plate which maintains the outside rose and knob in position and which is adapted to be joined to the inner rose through a bayonet joint connection, this bayonet joint connection being preferably releasable upon the depression of a spring latch member through a hole in the inside rose.

My invention contemplates also the ultilization of a most unique type of latch operating means embodied in a spindle manipulated by the inner knob. In the preferred embodiment of the invention, the spindle is hollow, and there is adapted to be maintained in the spindle an outside knob controlling member actuated by an inside finger piece. Naturally, I maintain the inside finger piece centrally relatively to the inner knob but I may mount it otherwise should I be inclined to do so. Preferably, also, the spindle is in the form of a hollow sleeve keyed to the inner knob, while the outside knob controlling piece is a member slidable within the hollow spindle and is adapted to actuate a clutch mechanism to disconnect and connect the outside knob relatively to the spindle.

In combination with this spindle and controlling mechanism, I utilize an outside knob having a pin tumbler cylinder, although other locking mechanisms may be utilized, which pin tumbler cylinder has a cam member adapted to rotate the spindle. This cam member, in the preferred embodiment of my invention, is so related to the spindle that the outside knob and its cylinder, if forcefully rotated, would do so without exerting any pressure on the spindle tending to rotate the spindle. The cam member is, in my preferred form, movable axially to engage the spindle and may then be made to rotate the spindle. This movement, incidentally, in no way affects the mechanism previously pointed out as adapted to lock the outside knob against operating the spindle, so that the key operation is independent of the outside knob, and when completed, the outside knob remains in its locked position.

Also, the sliding control member for the outside knob normally rotates with the spindle and the inner knob so as not to be affected by the normal operation of the inner knob, once the control member is particularly positioned by its finger piece.

In the preferred embodiment of my invention, I utilize rather novel means for not only releasing the outside knob from the spindle so that rotation thereof may not rotate the spindle, but I also arrange for the same means to deadlock the outside knob relatively to its rose.

An important feature of my invention relates to the method of maintaining the cylinder in the outside knob. I so mount the cylinder that it is readily removable by predetermined movement of its key plug without the use of any tools or other means. While removable cylinders and plugs are well-known in this art, I believe that I have invented a really unique combination operable along the lines indicated. In broad terms, the retaining means for my cylinder are retracted whenever the plug is rotated with the rose held fixed. The turning force on the plug is directed to the operation of the retaining means when the cam is held fixed. In the preferred embodiment of this feature of my invention, I utilize means operated by the force exerted against the cam to actuate the cylinder retaining means. More in detail, in order to remove my pin tumbler cylinder, I rotate the inner knob relatively to the outside knob so that the cylinder cam may no longer engage the spindle. Therefore, when the key plug is rotated in a manner tending to move the cam into spindle engaging position, and the cam is prevented from this movement, the force between the cylinder and the cam will tend to move the cam actuating means rearwardly because of the inability of the cam to move, and this rearward movement will operate to release the cylinder retaining means. The cylinder retaining means act also to maintain the cylinder against rattling in the knob by absorbing the play between the cylinder and knob.

I have gone into the general operation of the invention in some detail and I have explained in some detail also the features of the invention and the mechanical principles employed. I have done this to indicate broadly the results I obtain because while I wish to describe hereinafter a particular modification of my invention, I do not wish to be limited to that modification; rather, I am claiming a monopoly which is broadly outlined in the claims appended hereto.

For a detailed description of my invention, I shall now refer to the drawings wherein Fig. 1 is a plan view of the lock of my invention shown separate from the door but with its parts in normal assembled relation. Fig. 2 is an end view of Fig. 1, looking at the inside knob, while Fig. 3 is a similar view looking at the outside knob. Fig. 4 shows an end view of the latch assembly and Fig. 5 shows the coaction of this unit with a strike. Fig. 6 is a sectional view of my lock taken substantially centrally thereof and just slightly in front of the spindle. Fig. 7 is a section along lines 7—7 of Fig. 6. Figs. 8 and 9 are views of the latch assembly unit and rollback taken along lines 8—8 of Fig. 6 and showing the latch bolt projected and retracted, respectively.

Fig. 10 is a partial section taken on the side opposite Fig. 8 and shows the backset adjusting means and the latch bolt and its deadlocking member. Fig. 11 is a partial section at right angles to Fig. 10. Fig. 12 is a view of the latch bolt body while Fig. 13 is a section thereof along lines 13—13. Figs. 14 and 15 are respectively side and end views of the deadlocking lever, while Figs. 16 and 17 are side and end views of the auxiliary latch mechanism.

Figs. 18 and 19 are respectively end and side views of part of the outside knob control mechanism which is actuated by the inside finger piece. Figs. 20 and 21 show side and end views of the other half of the outside knob controlling mechanism. Fig. 22 is an assembly of the parts of Figs. 18–21. Figs. 23 and 24 are respectively end and side views of the spindle, while Figs. 25 and 26 are sections taken along the lines 25—25 and 26—26 of Fig. 24. Fig. 27 shows the outside knob and its control piece in unlocked position. Fig. 28 shows the outside knob locked and shows the parts thereof in assembled relation to the rose. Figs. 29, 30, and 31 are respectively front, side, and rear views of the outside knob. Fig. 32 is a view along the section lines 32—32 of Fig. 27. Figs. 33 and 34 are respectively side and end views of the outside rose. Fig. 35 shows the outside knob in assembled relation to the outside rose and the spindle. Fig. 36 is an end view along the lines 36—36 of Fig. 35.

Fig. 37 is a plan view of a washer member applied under the inside plate member, plan and side views of which are shown in Figs. 38 and 39. Figs. 40 and 41 are side and plan views of a latching member used in the plate of Fig. 38. Fig. 42 illustrates a spring used with the latch member. Fig. 43 shows a spring retainer utilized for maintaining the thumb piece in the inside knob. Fig. 44 is a view along the lines 44—44 of Fig. 47. Fig. 45 shows the inside thumb turn. Fig. 46 is a sectional view of the knob, while Fig. 47 is a view of the knob sleeve. Figs. 48 and 49 show a partial sectional side view and an end view of the inside rose. Fig. 50 is a sectional view along lines 50—50 of Fig. 46 taken with the thumb turn therein. Fig. 51 illustrates the tongue secured to the inside thumb turn, while Fig. 52 is an assembly member.

Fig. 53 shows the inside plate assembled relatively to the outside rose and knob. Fig. 54 is an assembly view of the inside knob. Figs. 55 and 56 are views taken along lines 55—55 of Fig. 53 showing the method of assembling the inside rose relatively to its supporting plate.

Fig. 57 illustrates the operation of the spindle by the cylinder carried in the outside knob. Fig. 58 is a partial section of the cylinder assembly, while Fig. 59 is an end view of parts of the same. Figs. 58a and 58b are views of the essential parts of Fig. 58 in different operating positions. Figs. 59a and 59b are views similar to Fig. 59 showing the parts thereof in positions corresponding to those of Figs. 58a and 58b. Figs. 60, 60a and 60b show the parts along the lines 60—60 of Fig. 58 in the positions corresponding to Figs. 58, 58a and 58b respectively. Fig. 61 is an assembly of the lock mechanism showing the parts of Fig. 57 in a different position. Figs. 62 and 63 illustrate two positions of the parts along the lines 62—62 of Fig. 61. Figs. 64 and 65 illustrate the assembly or removal of the cylinder relatively to the outside rose. Fig. 66 is a front view of the outside knob shown in Figs. 64 and 65. Fig. 67 is a view illustrating the operation of the cylinder releasing means.

Referring now more particularly to the drawings, and especially to Figs. 1–5, reference numeral 10 indicates the latch bolt which, together with an auxiliary latch bolt 11, is mounted in latch assembly tube 12. Reference numeral 13 indicates the outside knob, and reference numeral 14 indicates the inside knob. A finger piece or thumb turn 15 is utilized for controlling the outside knob in a manner to be indicated later on. The inside rose is indicated by reference numeral 16, while the outside rose is designated by reference numeral 17, the two parts being held together by means of a plate 82 and a pair of screws 81.

In Fig. 4 there is illustrated the front plate 20 of the latch bolt housing 12 and its relation to the latch bolt 10 and auxiliary latch 11. In Fig. 5 the relation of the latch bolt 10 and the auxiliary latch bolt 11 to a strike 21 is more clearly shown. In Figs. 2 and 3, the relation of the thumb turn 15 to the inside knob 14 and the relation of a pin tumbler cylinder 105 and its key plug 108 to the outside knob 13 are also clearly shown. As is well understood by those skilled in the art, the front plate 20 is a decorative plate secured by screws 24 to the non-decorative rear plate 20a.

In Fig. 6 I show the parts of my invention in assembled relation. At this time, I will refer only to Fig. 6 for the purpose of illustrating the relation of the spindle 25 and its rollback member 26 relatively to the bolt retracting portion 27 through which the rollback 26 is adapted to retract the latch bolt 10. In Fig. 8 I illustrate the latch bolt 10 projected and the rollback 26 held in its normal neutral position by shoulder members 28 on the latch retracting portion 27 of the latch bolt 10. In Fig. 9 I illustrate just how the latch bolt is retracted by operation of the rollback 26 against the members 28. It will be noted that the spindle 25 is keyed as at 29 to the rollback 26, this being quite well shown in Figs. 8 and 9. The latch bolt body is designated by reference numeral 30 in Fig. 12 and has slidably mounted thereon the latch retracting portion 27. The relation of these parts is well illustrated in Figs. 6, 10, and 12.

The rollback 26 is mounted in slidable relation to the portion 27 of the latch bolt so that the portion 27 may be moved to coact with the rollback in the position it is set by the particular position of the spindle 25. The rollback 26 is retained against axial movement on the spindle 25 and relatively to the portions 27 and 30 by the cooperation of its cam portion 26a with one side of the members 27 and 30, and the cooperation of its abutment 31 with the other side of the members 27 and 30. The member 27 is telescoped about member 30 and is slidable relative thereto by means of the screw threaded connection 32 of member 30 with the screw 33, the screw 33 being secured against longitudinal movement relatively to the body 27 by the plate 34. It is quite apparent that rotation of screw 33 by means of its head 33a will adjust the member 27 and its lugs 28 relatively to the bolt body 30 so as to bring the lugs 28 into cooperation with the cam portion 26a of the rollback 26 in any position which that cam may occupy as required by the particular back-set of the spindle 25 and the inside and outside knobs.

Referring now to Figs. 10, 11, and 12, the housing tube 12 of the latch bolt assembly is maintained by tongues 35 in assembled relation to the non-decorative front plate 20a which, in turn, is secured relatively to the decorative front plate 20. An end plate 36 is entered into tube 12 through slots 37 and 38a and is positioned therein as in Fig. 11. A relatively strong spring 38 operates between the end plate 36 and the wall 39 integral with the bolt body portion 30 and serves to maintain the plate 36 in the position illustrated in Fig. 11. This spring also serves to maintain the bolt body 30 projected relatively to the end plate 36, as is also readily apparent.

A pin 40 is mounted in the end plate 36 and supports thereon a tube 41 secured to the latch bolt 10, a spring 42 being mounted about the pin 40 and adapted to project the latch bolt 10 outwardly relatively to the main bolt body 30 and relatively to the end plate 36. This spring 42 is relatively light, as compared to the spring 38, so that the bolt 10 may be readily pushed inwardly relatively to the bolt body 30, a relatively strong effort being required to retract the entire body 30 and latch bolt 10 against the spring 38. It should be indicated at this point that the latch bolt 10 is connected for retraction with the latch bolt body 30 by means of a plate 56 secured by tangs 57 and 58 to the body 30 and the latch bolt 10, as is seen in Fig. 11.

A deadlocking lever 43, best shown in Figs. 14 and 15, has a tang 44 entered into a slot 45 in the end plate 36 whereby it may be retained relatively to the end plate. Also, the lever 43 has a further protruding portion 46 which rests under one of the end coils of spring 38, as illustrated in Fig. 11, so that it may be urged in a clockwise direction relatively to the plate 36 and so that its detent locking portion 47 may normally be entered into a notch 48 in the latch bolt 10. For operating this deadlocking lever 43 to permit retraction of bolt 10 through its body 30, and for withdrawing the detent portion 47 from the notch 48, I utilize a cam face 49 on the latch bolt body 30, this cam face cooperating with a surface 49a on the lever 43 for camming that lever in a counter clockwise direciton against the force of the spring 38 when the latch bolt body 30 is retracted by the rollback 26.

For further controlling the deadlocking lever 43, I utilize an auxiliary bolt 11, best shown in Figs. 16 and 17. This auxiliary bolt has a portion 51 operating in a bearing in the latch bolt 10. It is projected in an outward direction by a spring 52 mounted about a pin 53 secured in the hole 54 of the latch bolt body 30 (Fig. 13). A lug 55 thereon coacts with the surface 47a of the lever 43 to maintain the lever 43 out of the notch 48, except when the auxiliary bo't is in the position of Fig. 5.

The operation of the latch bolt assembly is as follows. With the latch bolt 10 projected and the auxiliary latch bolt occupying its position of Fig. 10, which is the position of the parts with the dcor open, any slight force on the latch bolt 10 will retract the same against its spring 42, and this movement will be effective also to retract the auxiliary bolt 11. It will be evident that the lug 55 on the auxiliary latch 11, by acting on the under surface 47a of the detent 43, has maintained the same in an upward position and out of deadlocking relation to the latch bolt 10 to permit this retraction. Should the door carrying the latch bolt 10 move to a locked position, illustrated in Fig. 5, the latch bolt 10 and the auxiliary latch 11 will move to their relative positions illustrated in Fig. 5.

The lug 55 will then not be in a position to prevent the deadlocking lever 43 from deadlocking the latch bolt 10, and the latch bolt 10 will be deadlocked against jimmying action. If, however, in the condition of the parts illustrated, the rollback 26 be operated, its cam portion 26a will operate against one of the lugs 28, thus moving the latch body 30 rearwardly as seen in Fig. 11. This will first cause the cam portion 49 of the latch body to act against the under surface 49a of the lever 43, moving the detent portion 47 out of notch 48 in the latch bolt 10. It will be noted in Fig. 11 that there is a spaced relation between the end surface of the detent portion 47 of the lever 43 and the end surface of the notch 48, thus allowing a slight retraction of the latch bolt 10 before the end surface of the notch 48 comes against the detent portion 47. The slight movement thus permitted allows the cam portion 49 to move the lever 43 from deadlocking position, after which the latch body 30 and the bolt 10 may be retracted as a unit.

Referring now to Figs. 23 and 24, 25 and 26 the spindle member 25 is shown as slotted at 60 through its length so that it may be keyed through key 61 (Fig. 44) to the sleeve portion 14a of the inside knob 14, as is best illustrated in Fig. 7. The spindle 25 is slotted further at 61a for the admission of a lock operated cam or lug to be described later. The slot 61a also guides the controlling portion 62 of a control assembly which includes the member 62 and a sleeve 63. The member 62 is secured against endwise separation from the sleeve 63 by a tang 64 integral with the sleeve 63 and punched downwardly into the recess 64a of the member 62 when the two are joined, as shown in Fig. 22.

The sleeve 63 is housed within the hollow spindle 25 and is moved axially relatively to the spindle 25 by means of its pin 65 operating in a cam groove 66 in the spindle 25. The end surface of the sleeve 63 is formed as is best shown in Fig. 21, with a slot 67 in which a tongue piece 68 (Fig. 51) secured to the inside thumb turn 15 is adapted to rest. The spindle 25 is further equipped with a pair of bored holes 69, and rounded portions 70a, for a purpose to be described later.

The outside knob 13 is best shown in Figs. 29 and 30, in Fig. 30 the cylinder lock therein being shown in phantom. The sleeve 13a of the knob is perforated as at 70 for a purpose to be indicated later on. At 71, the knob sleeve is formed with a pair of recesses, the purpose of which will also be explained later on. The knob 13 is adapted for support in the outside rose 17 and is maintained against axial movement relatively to this rose by a sliding detent member 72 resting in a groove 73 of the knob sleeve, as is best shown in Fig. 28. The spindle 25 is adapted to be inserted into the knob 13 through the cylinder opening of the knob until the shouldered portion 74 of the spindle abuts the shoulder 75 in the knob sleeve. In this way the knob is so mounted with relation to the spindle that it may be rotated relatively to the spindle 25, but is not movable endwise relatively to said spindle. This is helpful in the assembly of the lock.

The rose 17 has a pair of recesses 76, best shown in Fig. 34, into which a pair of balls 77 may ride to lock the knob relatively to the rose when the balls are partially propelled outwardly from the knob sleeve through holes 70 therein. This operation of the balls 77 is accomplished by the member 62 which is movable endwise relatively to the spindle 25 by its sleeve 63 through pin 65 operating in the spindle cam groove 66. Movement is transmitted to the sleeve 63 by the tongue member 68 rotatable by the finger piece 15. It is quite obvious that rotation of the finger piece 15 will rotate the sleeve 63 which will cause its pin 65 riding in the groove 66 to move the sleeve 63 axially in the spindle 25, and from the position of Fig. 27 to the position of Fig. 28. The member 62 will be restrained from this rotation, being guided in the groove 61a of the spindle 25, but it will move axially with the sleeve 63. In so moving, it will force the balls 77 from the position of Fig. 27 to the position of Fig. 28, and will lock the knob to the rose 17.

As was indicated previously, the knob sleeve is equipped with a pair of recesses 71. With these recesses cooperate the locking balls 79 which are actuated by a cam portion 80 of the member 62. These balls are mounted so that when the member 62 and its cam portion 80 are in the position of Fig. 27, the balls 79 will be maintained, by a further portion 81 of the member 62, partially within the recesses 71 of the knob sleeve and partially within the spindle holes 60. When, however, the member 62 is moved to the position of Fig. 28, the balls 79 will drop out of the recesses 71 into the position indicated in Fig. 28. It will be understood that when the balls 79 are in their position illustrated in Figs. 32 and 27, the knob spindle is locked to the knob, and the knob will rotate with the spindle. The balls 77, it will be recalled, will be in a position to permit this rotion of the knob 13. With the parts in the position of Fig. 28, the spindle will be free relatively to the knob, and it will be remembered that the knob will be locked relatively to its rose by balls 77. In this position of the parts, the spindle may be rotated freely of the locked knob 13 by rotation of the inside knob 14, as has been explained already.

The outside knob 13 must naturally not be secured to the door by any means which may be accessible. I utilize a rather unique method of securing the outside knob to the door and for maintaining the entire lock assembly on the door. The outside rose 17 is equipped with extensions 17a, each of which is screw threaded as at 80'. Cooperating with extensions 17a and the screw threads 80' are a pair of screws 81, best illustrated in Fig. 53, which act to secure to the outside rose 17 the inside plate member 82, in a manner best illustrated in Fig. 53. For spacing this plate member 82 relatively to the door I may employ a washer member 83', shown in Fig. 37. Referring now to Figs. 38–42 inclusive, the plate member 82 is equipped with a series of lugs 83 adapted to form a bayonet joint with the inside rose, as will be explained later. The plate 82 is further equipped with a pair of cutaway portions 84 which cooperate with lugs 85 of the washer member 83'.

In addition, the plate 82 has a spring pressed latch member 86 outwardly pressed by a spring 87 and limited in its outward movement by a pin 88 cooperating with the slotted portion 89 thereof.

In Fig. 53 I illustrate the mounting of the inside plate relatively to the door and the rose 17, and I show in phantom lines the application of the inside rose 16 to this plate. In Fig. 55 the plate is shown assembled relatively to the outside rose by the screws 81, and the inside rose 16 is shown just as it is snapped over the plate 82 and just as it has pressed the latch member 86 inwardly. The rose 16 is equipped with a series of inside lugs 90 and a slotted portion 91. When first inserted over the plate 82, the lugs 90 and the slot 91 are spaced relatively to the projections 83 and the latch 86, as illustrated in Fig. 55. However, when the rose member is rotated approximately forty-five degrees, the lugs 90 will interlock with the projections 83 in the manner of a bayonet joint, and the latch member 86 will have entered the slot 91. Thereafter, it will be impossible to separate the inside rose 16 from its bayonet joint connection with the plate 82 unless a tool is utilized which depresses the latch 86, whereupon a retractive rotation of forty-five degrees will once more bring the parts into the position of Fig. 55 for endwise separation.

Referring now to Figs. 45–48, I show my inside knob 14 screw threaded for ready assembly with its sleeve 14a, the detent member 92 being utilized to hold the inside knob and sleeve assembled to the rose 16, as will be quite apparent.

The tongue piece 68 is pinned at 93 to the inside finger piece or thumb turn 15. The finger piece itself is drilled at 94, a spring 95 and a ball 96 being arranged to maintain it in one of two ninety-degree positions with the ball 96 in the slot 97 or in the slot 98. The construction is such that the ball 96 will maintain the finger piece 15 in the particular position in which it may have been placed relatively to the knob 14, so that the finger piece, knob, tongue 68, sleeve 63, and the spindle 25 will all rotate together. Incidentally, it may be well to indicate that spring ring 99 operating in the cooperating grooves 100 and 101 of the finger piece and knob respectively maintains the finger piece against endwise movement relatively to the knob.

It will be recalled that the spindle 25 is adapted to be released from any connection with the outside knob 13 when the outside knob is locked by the operation of the finger piece or thumb turn 15. In this relation of the parts, the outside knob and cylinder will occupy a position relatively to the sleeve 25, which is best illustrated in Fig. 61. Should it now be required to operate the spindle 25 from the outside to retract the latch bolt 10, some means of connection between the cylinder and the spindle will be required. I prefer to use a rather unique type of pin tumbler cylinder mechanism which is best illustrated in Figs. 57–60b, inclusive.

My cylinder preferably embodies a general assembly member 105 of the type having a driver bearing portion 106 and a plug bore portion 107 in which a key plug 108 is mounted for rotation. I could, of course, use merely a self contained tumbler plug if I so desired. For retaining the plug 108 against separation from the cylinder 105, I utilize a pin member 109 operating in a groove 110 of the plug. The end of the plug 108 is bored out as at 111 for housing the cylindrical portion 112 of a cam member 113 having a rectangular cam lug 114. Integral with the cam 113 is a pin 115 which is adapted to rest in a short groove 116 in a sleeve-like extension 116a of the cylinder member 105, and is guided by a further cam groove 117 in a sleeve member 118 which is mounted about the end of the plug 108 and between the plug and the extension 116a of the cylinder. As is probably best shown in Figs. 58 and 67, the sleeve member 118 has an integral lug 119 formed thereon to cooperate with a slot 119a in the end of the plug 108 so that the sleeve may rotate with the plug but may move axially relatively thereto in two directions.

The initial position of the aforementioned parts of the cylinder lock assembly is shown in Figs. 58, 59, and 60. The pin 115 is positioned in the groove 116 of the cylinder extension 116a and in the closed end of the cam groove 117 of the sleeve 118, while the rectangular cam lug 114 is entirely retracted and is in the horizontal position of Fig. 59. The position of the parts after slight movement of the plug is illustrated in Figs. 58a, 59a, and 60a. Integral rotation of the sleeve 118 with the plug 108 has caused the cam groove 117 to move the pin 115 outwardly from the groove 116. This has caused an endwise movement of the lug 114 to a point where it may enter the slot 61a in the spindle 25, the spindle being shown in phantom in Fig. 60a. The lug 114 is still in a horizontal position as shown in Fig. 59a. Further rotation of the plug 108 will cause the cam groove 117 to move the pin 115 to the position illustrated in Fig. 60b, thus rotating the pin 115 together with the cam 113 and lug 114 to the position of Fig. 59b, which movement will be effective to rotate the spindle in a latch retracting direction. Fig. 57 illustrates a rotated position of the spindle 25.

The operation of the parts just described may be summarized as follows: Rotation of the plug 108 by a key will act through the sleeve 118 to move the pin 115 until it reaches the end of the slot 116 in the cylinder sleeve extension 116a. Thereafter, continued rotation will cause the cam groove 117 to rotate the pin 115 and therefore the cam lug 114 from the position of Figs. 59a and 60a to the position of Figs. 59b and 60b, which rotation will rotate the spindle, which will have been contacted by lug 114 during its initial movement from the position of Fig. 60.

The construction of my cylinder lock is such that not only does it cooperate with the spindle of my lock in a unique and novel manner, but it becomes a readily removable and insertible cylinder, which may be readily removed and inserted without use of tools or other appliances. My cylinder 105 has a bayonet joint connection with the outside knob 13. As best illustrated in Figs. 29 and 66, the outside knob 13 is formed with a circumferential lip 120 which is cut away at point 121. This cutaway portion 121 is substantially the shape of the driver portion 106 of my cylinder, so that when the cylinder is placed with the portion 106 opposite the cutaway portion 121, the cylinder may enter the knob as is illustrated in Fig. 65. Once the cylinder is fully inserted, it may be rotated, as shown by arrows 66a and 66b, so as to form a bayonet joint with the knob in a manner best illustrated in Fig. 64, and with a shoulder portion 106a of the driver section 106 against a solid portion of the lip 120.

For preventing rotation of the cylinder 105 to realign the driver portion 106 with the cutaway portion 121 of the lip 120 (shown by arrows 66a), I utilize a spring pressed pin member 122 urged outwardly from the cylinder by a spring 123, but retained against full outward movement by a pin 124. The normal position of the pin 122 is best illustrated in Fig. 58. With the bayonet joint made between the shoulder 106a and the lip 120 for retaining the cylinder, the pin 122 will jump into a cutaway sector 125 in the knob 13 and will thereafter prevent the cylinder from rotating relatively to the knob, which rotation it will be recalled, is required to break the bayonet joint connection between the knob and cylinder. A further function of member 122 is to keep the cylinder 105 from rattling in the knob.

It will be recalled that upon rotation of the key plug 108 and the cylinder 118, the cam lug member 114 is compelled to move outwardly by coaction of the pin 115 with the groove 117 of the sleeve 118. Referring to Fig. 58, it will be noticed that the sleeve 118 may move inwardly relatively to the sleeve-like extension 116a of the cylinder 105. It will be readily appreciated that when the pin 115 and member 114 are held fixed against endwise movement, rotation of the sleeve 118 by the plug 108 relatively to fixed pin 115 will cause the sleeve 118 to ride to the left from its position of Fig. 58. In so moving, it must move the pin 122 against the pressure of spring 123. For obtaining this retractive movement of the sleeve 118, it is merely necessary to rotate the inner knob so as to move the slot 61a from the position of Fig. 62 where it is opposite the lug 114, to the position of Figs. 61 and 63 where it is at right angles to the lug 114. Thereafter, rotation of the key plug 108 can not in Figs. 61 and 63 move the lug 114 and pin 115 in an endwise direction. Rotation of the plug 108 must therefore cause a rearward movement of the sleeve 118, which movement is well illustrated in Figs. 64 and 67, wherein the pin 122 is shown moving out of its sector 125. With the parts in the position of Fig. 64, it is very simple to rotate the cylinder to the position of Fig. 65 and remove the same outwardly from the knob 13.

Having now described the operation of a preferred embodiment of my invention, I claim:

1. In a lock, a rollback, a spindle for operating said rollback, an outside knob mounted freely relatively to said spindle, means operable for connecting and disconnecting said outside knob from said spindle, a key actuated element carried by said outside knob and rotatable relatively to said knob, and means whereby said element when rotated first moves endwise to engage said spindle and then rotates said spindle independently of said outside knob.

2. In a lock, a rollback, a spindle for operating said rollback, an inside knob fixed to said spindle, an outside knob mounted freely of said spindle, means carried by said inside knob for connecting and disconnecting said outside knob from said spindle, a key actuated lock in said outside knob, having a rotatable key plug and a cam juxtaposed relatively to the end surface of said spindle and adapted to engage and rotate said spindle, and means whereby key rotation of said plug moves said cam into engagement with the spindle while continued rotation of said key plug rotates said cam and spindle independently of said outside knob.

3. In a lock, a rollback, a hollow spindle for operating said rollback, an inside knob secured to said spindle for operating the rollback, an outside knob having a key operated lock therein, said outside knob and lock being both freely mounted relatively to said spindle, means operated by key operation of the lock for rotating said spindle independently of said outside knob, means movable in said hollow spindle for connecting said outside knob to said spindle, a finger piece carried by said inside knob, and means of connection between said finger piece and said means movable in said hollow spindle.

4. In a lock, a rollback, a spindle, an inside knob secured to said spindle for rotating the same, an outside knob having a key operated locking element therein, said knob and locking element being both freely mounted relatively to said spindle, a rose on which said outside knob is mounted, a pair of ball members adapted to lock and release said outside knob relatively to said rose, a second pair of ball members adapted to lock and release said outside knob relatively to said spindle, means in said spindle adapted to actuate said ball members to lock the outside knob to the rose while releasing it from the spindle, or to release the outside knob from the rose while locking it to the spindle, a finger operated piece carried by said inside knob for operating said means, and means actuated by key operation of said locking element for rotating the spindle regardless of the condition of said outside knob.

5. In a lock, a spindle, a rollback actuated by said spindle, an outside rose, an outside knob mounted in said rose, detent means arranged between said rose and outside knob for locking said outside knob to said rose, said detent means extending down into the spindle when said outside knob is free from said rose, detent means between said spindle and outside knob for locking the outside knob to the spindle and adapted to lie in said spindle when said outside knob is free therefrom, a member mounted in said spindle and adapted for movement relatively thereto, said member having means for actuating said detent means to release the outside knob from its rose while locking it to the spindle, and for locking the outside knob to the rose while releasing it from the spindle.

6. In a lock, a spindle, a rollback actuated by said spindle, an inside knob secured to said spindle for rotating the same, an outside rose, an outside knob mounted in said rose, detent means arranged between said rose and outside knob for locking said outside knob to said rose, said detent means extending down into operating relation with the spindle when said outside knob is free from said rose, detent means between said spindle and outside knob for locking the outside knob to the spindle and adapted to lie in said spindle when said outside knob is free therefrom, a member mounted in said spindle and adapted for movement relatively thereto, means whereby said member actuates said detent means to release the outside knob from its rose while locking it to the spindle, and locks the outside knob to the rose while releasing it from the spindle, means on said inside knob for operating said member, said member being rotatable with said spindle and inside knob during normal rollback operating movement of said inside knob.

7. In a lock, a spindle, a rollback actuated by said spindle, an outside rose, an outside knob mounted in said rose, detent means arranged between said rose and outside knob for locking said outside knob to said rose, said detent means extending down into the spindle when said outside knob is free from said rose, detent means between said spindle and outside knob for locking the outside knob to the spindle and adapted to lie in said spindle when said outside knob is free therefrom, a member mounted for movement in said spindle and adapted for movement relatively thereto, said member having means for actuating said detent means to release the outside knob from its rose while locking it to the spindle, and for locking the outside knob to the rose while releasing it from the spindle, and a key operated lock carried by said outside knob for operating said spindle when said outside knob is locked to its rose but is released from the spindle.

8. In a lock, a rollback, a hollow spindle for rotating said rollback, an inside knob for rotating said spindle, an outside knob mounted freely relatively to said spindle, a slide member in said spindle, means on said inside knob movable relatively to said knob for moving said slide member, and ball members movable by said slide into and out of aligned openings of said outside knob and spindle to secure said knob to said spindle.

9. In a lock, a rollback, a hollow spindle for rotating said rollback, an inside knob for rotating said spindle, an outside knob mounted freely relatively to said spindle, a slide member in said spindle, means on said inside knob movable relatively to said knob for moving said slide member, an outside rose relatively to which said outside knob rotates, aligned openings between said rose and knob, aligned openings between said knob and spindle, and ball locking members adapted to lock said spindle to said knob and said knob to said rose through proper positioning in said aligned openings, and means on said slide member for so positioning said balls as required.

10. In a lock of the class described, a latch bolt, means for retracting said latch bolt, an inside knob operatively connected at all times to said means for retracting said latch bolt, an outside knob, a finger piece on said inside knob, and means actuated by said finger piece whereby to render said outside knob operative and inoperative to retract said latch bolt, a cylinder lock mounted on said outside knob, a cam carried by said cylinder lock and normally held in a neutral position relatively to said outside knob whereby it is inoperative to actuate said means for retracting the latch bolt when rotated with said outside knob, and means whereby key operation of said cylinder lock moves said cam relatively to said outside knob and retracts said latch bolt independently of said outside knob.

11. In a lock, a rollback, a hollow spindle for rotating said rollback, an inside knob for rotating said spindle, an outside rose, an outside knob rotatable relatively to said rose for operating said spindle, a slide member in said spindle, means on said inside knob movable relatively to said knob for moving said slide member, and ball members movable by said slide member into and out of aligned openings of said outside knob and rose to secure said knob to said rose.

12. In a lock, a rollback, a hollow spindle for rotating said rollback, an inside knob for rotating said spindle, an outside knob for rotating said spindle, a slide member in said spindle, means on said inside knob movable relatively to said knob for moving said slide member, and ball members movable by said slide member into and out of openings of said outside knob to secure said knob against rotation.

13. In a lock, a rollback, a hollow spindle for rotating said rollback, an inside knob for rotating said spindle, an outside knob mounted freely relatively to said spindle, a slide member in said spindle, means on said inside knob movable relatively to said knob for moving said slide member, detent means for securing said outside knob to said spindle operated by said slide member, a cylinder lock carried by said outside knob, a cam on said cylinder lock normally positioned so as not to obstruct the normal free rotation between the spindle and outside knob, and means whereby key operation of said cylinder lock moves said cam into operative engagement with said spindle whereby to rotate said spindle and to operate said rollback independently of said outside knob and said detent means securing the outside knob to said spindle.

14. In a lock, a rollback, a spindle, an inside knob secured to said spindle for rotating the same, an outside knob having a key operated locking element therein, said knob and locking element being both freely mounted relatively to said spindle, a rose on which said outside knob is mounted, a pair of ball members adapted to lock and release said outside knob relatively to said rose, a second pair of ball members adapted to lock and release said outside knob relatively to said spindle, means in said spindle adapted to actuate said ball members to lock the outside knob to the rose while releasing it from the spindle, or to release the outside knob from the rose while locking it to the spindle, and a finger operated piece carried by said inside knob for operating said means.

KARL A. BRAUNING.